(12) United States Patent
Apelqvist et al.

(10) Patent No.: US 9,781,383 B2
(45) Date of Patent: Oct. 3, 2017

(54) MEDIA STREAM FROM SENDER SEEN ON RECEIVER SIDE BEFORE CONFIRMING RECEIPT OF MEDIA STREAM

(71) Applicant: Sony Corporation, Tokyo (JP)

(72) Inventors: Johan Apelqvist, Rydebäck (SE); Henrik Bengtsson, Lund (SE); Linus Mårtensson, Lund (SE); Christopher Ohlsson, Malmö (SE); Per Ögren, Malmö (SE)

(73) Assignees: SONY CORPORATION, Tokyo (JP); SONY MOBILE COMMUNICATIONS INC., Tokyo (JP)

( * ) Notice: Subject to any disclaimer, the term of this patent is extended or adjusted under 35 U.S.C. 154(b) by 0 days.

(21) Appl. No.: 14/576,432

(22) Filed: Dec. 19, 2014

(65) Prior Publication Data
US 2015/0222850 A1    Aug. 6, 2015

Related U.S. Application Data

(63) Continuation of application No. PCT/IB2014/000103, filed on Feb. 4, 2014.

(51) Int. Cl.
*H04N 7/14* (2006.01)
*H04L 29/06* (2006.01)

(52) U.S. Cl.
CPC ......... *H04N 7/147* (2013.01); *H04L 65/1069* (2013.01); *H04L 65/1089* (2013.01); *H04L 65/4069* (2013.01)

(58) Field of Classification Search
USPC .................................................... 348/14.12
See application file for complete search history.

(56) References Cited

U.S. PATENT DOCUMENTS

| 2006/0121924 A1* | 6/2006 | Rengaraju | H04N 7/142 455/518 |
| 2015/0222850 A1* | 8/2015 | Apelqvist | H04N 7/147 348/14.12 |

FOREIGN PATENT DOCUMENTS

| AU | WO 2013003878 A1 * | 1/2013 | ........ H04L 12/66 |
| EP | 2 117 198 A1 | 11/2009 | |

OTHER PUBLICATIONS

International Search Report issued for corresponding application No. PCT/IB2014/000103, mailed on Sep. 5, 2014, 3 pages.

\* cited by examiner

*Primary Examiner* — Amal Zenati
(74) *Attorney, Agent, or Firm* — Tucker Ellis, LLP (57) ABSTRACT

The present disclosure relates to electronic communication devices, and more specifically to streaming media between the electronic communication devices. The present disclosure relates to a method for setting up a media stream connection between a sending device 100, 110 and at least one receiving device 200, 210. The method comprises sending a session initiation message S10 to the at least one receiving device, sending a request S20 for a list of IP-addresses of the at least one receiving device and receiving S30 the list of IP-addresses from the at least one receiving device. The method further comprises setting up uni-directional or bi-directional connection between the sending device 100, 110 and the at least one receiving device 200, 210 by using the received list of IP-addresses and sending the media stream S50 via the uni-directional or bi-directional connection to the at least one receiving device.

15 Claims, 7 Drawing Sheets

MEDIA STREAM FROM SENDER SEEN ON RECEIVER SIDE BEFORE CONFIRMING RECEIPT OF MEDIA STREAM

CROSS REFERENCE TO RELATED APPLICATION

This is a continuation of copending International Application PCT/IB2014/000103, with an international filing date of Feb. 4, 2014.

TECHNICAL FIELD

The present invention relates in general to streaming media between electronic devices. The invention discloses a method for setting up a media stream between a sending device and at least one receiving device. In particular the invention provides an improved method for setting up a media stream between a sender and a receiver and displaying the media stream on the receiver side before confirming receipt of the media stream.

BACKGROUND ART

Today, when a user receives an incoming video call from someone on Skype, FaceTime or other video applications, the user interface has the same appearance as if it was an incoming voice call, thus the receiver does not see the initiator of the video call. This might be inconvenient for the receiver since he may not want to set up a video call or is not capable of receiving a video call.

SUMMARY OF THE INVENTION

With the above description in mind, then, an aspect of some embodiments of the present invention is to provide an method that makes it possible for the receiver to see a media stream, i.e. the initiator of a video call, before the receiver decides to answer the call and if he wants to turn on the camera of the receiving electronic device and send a media stream in return, which seeks to mitigate, alleviate or eliminate one or more of the above-identified deficiencies in the art and disadvantages singly or in any combination.

According to one aspect of the disclosure, it provides for a method for setting up a media stream connection between a sending device and at least one receiving device, performed in the sending device. The method comprises the steps to send a session initiation message to the at least one receiving device, to send a request for a list of IP-addresses of the at least one receiving device, to receive the list of IP-addresses from the at least one receiving device, to set up uni-directional connection between the sending device and the at least one receiving device by using the received list of IP-addresses and to send the media stream via the uni-directional connection to the at least one receiving device. Such a solution allows for the user of the sending device to send the media stream before the receiving device is confirming receipt of the media stream. In one example, a video surveillance device will be able to set up a one way connection with a pre-selected receiving mobile phone and start to stream a surveillance video when trigged by an alarm without the receiving mobile phone has to confirm receipt of the media stream.

According to one aspect of the invention, the session initiation message comprises information about which device to send the media stream, which is the receiving device and a list of IP addresses comprised in the sending device. This gives a more precise indication regarding which device to contact and which device set up a connection with.

In one aspect the list of IP-addresses is collected by using Session Traversal Utilities for Network Address Translator protocol, STUN.

In one aspect the step of set up uni-directional connection further comprises the step to connect to the receiving device using Internet Communication Engine protocol, ICE, by trying all the IP-addresses of the list belonging to the sending device comprised in the session initiation messages.

In one aspect the step of connecting further comprises to create a peer-to-peer connection if ICE connection is established and to create a connection via a TURN server if ICE connection fails.

According to one aspect the method further comprises the step of sending a request to set up a bi-directional connection between the sending device and the at least one receiving device. According to one aspect the method further comprises the step of receiving permission to set up a bi-directional connection from the receiving device.

According to one aspect the method further comprises the step of receiving media stream from the receiving device. By permitting a setting up a bi-directional connection gives the receiving device the possibility to send a media stream in return to the sending device.

According to one aspect the method further comprises the step of receiving a rejection to set up a bi-directional connection and to send media stream to said receiving device until receiving a disconnect of said uni-directional connection. This allows for the sending device to continue to stream media even though the receiving device do not confirm receipt or send a rejecting message.

According to one aspect of the disclosure, it provides for a method for setting up a connection for streaming media between a sending device and at least one receiving device, performed in the receiving device. The method comprises the steps to receive a session initiation message from said sending device, to create a list of IP-addresses belonging to the receiving device and transmit the list to the sending device and to receive and present the media stream on a user interface of the receiving device for acceptance from the receiving device. Such a solution allows for the user of the receiving device to receive the media stream before the receiving device has confirmed the receipt of the media stream.

According to one aspect the method further comprises the step to receive a request to set up a bi-directional connection between the receiving device and the sending device.

According to one aspect the method further comprises the step to send permission to set up a bi-directional connection to the sending device. According to one aspect the method further comprises the step to send a media stream to the sending device. By permitting a setting up of a bi-directional connection gives the receiving device the possibility to send a media stream in return to the sending device.

According to one aspect the method further comprises the step to connect to the sending device using Internet Communication Engine protocol, ICE, by trying all the IP-addresses of the list belonging to the receiving device.

According to one aspect the method further comprises the step to send a rejection to set up a bi-directional connection to said sending device. By sending a rejection to connect to the sending device gives the receiving device the possibility to continue receiving the media stream from the sending device or not and at the same time the sending device will not see the user of the receiving device.

The features of the above-mentioned embodiments can be combined in any combinations.

Some embodiments of the invention provide for a method for setting up a connection and send the media stream from a sender to a receiver and present the media stream to the receiver before the receiver confirms receipt of media stream. It is an advantage with some embodiments of the invention that they may allow for the receiver to decide whether to answer an incoming video call, media stream, by sending a video stream in return, to answer without sending a video stream in return or not to answer. In some embodiment of the invention the sending device is a server, such as a surveillance camera, that stream video taken over a surveillance area. It is an advantage with this set up that the surveillance video is streamed to the receiver before the receiver confirms receipt, which may be of high importance if i.e. someone is trespassing or if there is a fire.

BRIEF DESCRIPTION OF THE DRAWINGS

Further objects, features and advantages of the present invention will appear from the following detailed description of the invention, wherein embodiments of the invention will be described in more detail with reference to the accompanying drawings, in which.

DETAILED DESCRIPTION

The invention makes it possible for a receiver of a media stream, e.g. a video call, to view the media stream, e.g. video of the initiator of the video call, before the receiver decides to answer the video call. The receiver may also be able to decide whether to setup a media stream in return, e.g. turn on the camera on the receiving device and streaming media in return, or only to receive the streaming media, e.g. from a surveillance camera.

Streaming media is media that is constantly received by and presented to an end-user, e.g. receiving device, while being delivered by a provider, e.g. sending device. Live streaming media, which refers to content delivered live over Internet, requires a sensor for the media, e.g. a camera, an encoder, comprised in a controller, to digitize the content, a media publisher, e.g. a view finder comprised in the sending and the receiving electronic device, and a content delivery network to distribute and deliver the content. Media can be video from a camera sensor, temperature from a temperature sensor, infrared light from a heating sensing camera, sound from a microphone, pulse from a pulse sensor, pressure from a pressure sensor.

Embodiments of the present invention relate, in general, to the field of electronic devices. The present invention is for example applicable in electronic devices such as mobile telephones, pagers, communicators, wearable devices such as wristlet, clock or the like, smart phones, laptops, computers, or electronic organizers. The present invention is applicable and suitable for all electronic devices with visual interface and wireless capability, connectable to a server or any type of external memory/processor source. The description is focused on components relevant to the specific objects and functions of the invention while other components may be conventional. However, for the sake of clarity and simplicity, most embodiments outlined in this specification are related to electronic communication devices or electronic devices.

Embodiments of the present invention will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference signs refer to like elements throughout.

The invention will now be described in more detail. According to one aspect of the invention, shown in FIG. 1, an electronic device, e.g. a mobile phone, is illustrated generally at 100 or 200. However, as mentioned above, reference to "mobile phone" includes various other devices, such as, for example, those mentioned above.

Figure 1:
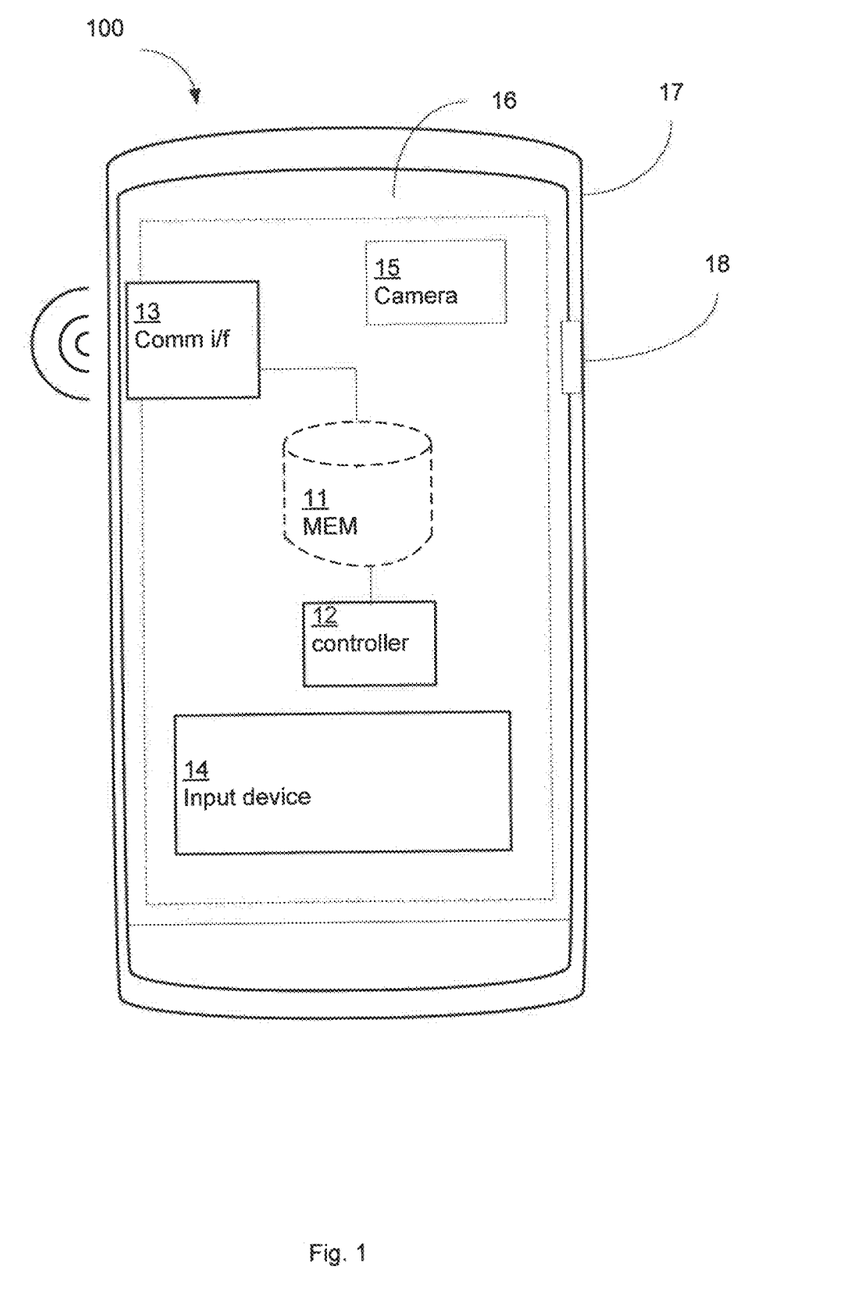
FIG. 1 discloses a block diagram of an electronic device, e.g. a mobile phone where the method is implemented.

The mobile phone 100 comprises conventional components such as radio interfaces for wireless communication, an input unit 14, such as a number of keys, etc. The keys may include a number of keys having different respective functions. For example, the keys may include a navigation key, selection key or some other type of key. The mobile phone further comprises a case 17, a display 16, e.g. liquid crystal display, light emitting diode display, or other display and an on/off switch 18. The mobile phone also include a speaker, microphone, among others, which together with the display 16 and keys 14 may be used and function in the usual ways in which a mobile phone typically is used, e.g. to initiate, to receive and/or answer telephone calls, to send and to receive text messages, to connect with and carry out various functions via a network, such as the internet or some other network. These are examples, there may be other uses that currently exist or may exist in the future. The mobile phone further includes a controller circuit 12. The controller circuit is configured to execute the method according to the invention. The controller is typically a processor comprising a computer code for executing the method. However, the method may as well be hardware implemented or a combination of hardware and software.

The mobile phone also includes a sensor, i.e. a camera 15, which is arranged to receive or to capture an image or a media stream, i.e. a video stream. The camera may be the same type of camera typically used in a mobile phone or it may be another type of camera. As an example, the camera 15, display 16 and an image capture key 14 may be used in a conventional manner to capture an image or filming, e.g. the view seen by the camera 15 may be shown on the display 16 while the user views that image or film and as desired selectively presses the image capture key 14 to capture an image or a video and to store the captured image or video in a memory 11.

Figure 2A:
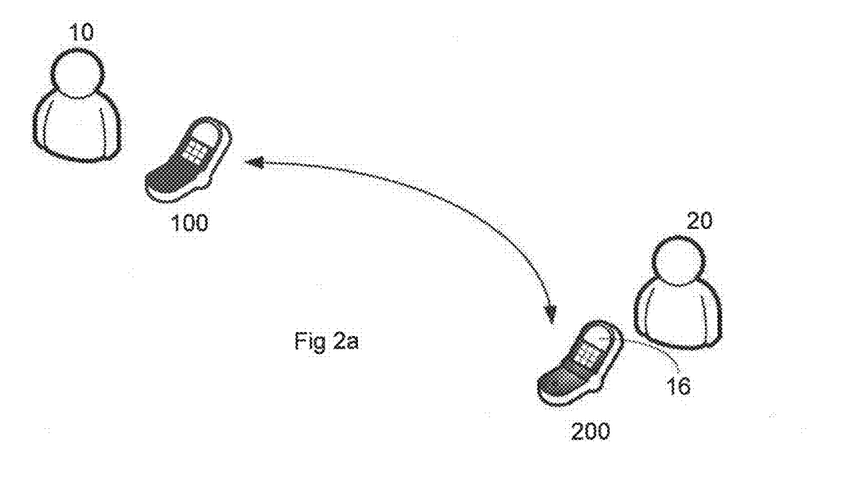
FIG. 2a-c discloses a system comprising of a sending electronic device and a receiving electronic device according to the disclosure.
Figure 2B:
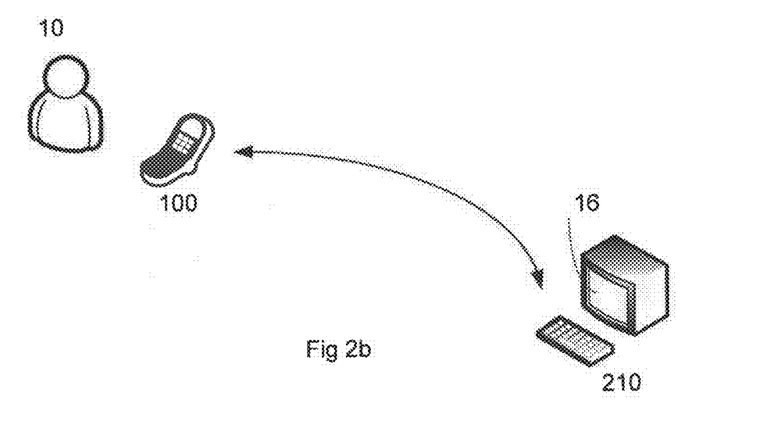
Figure 2C:
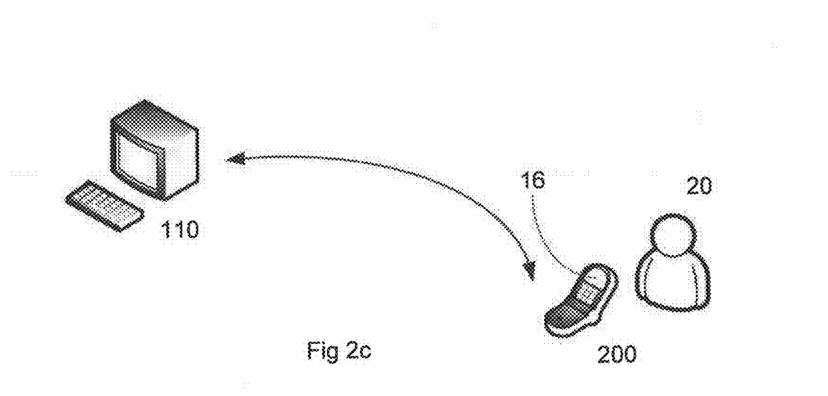

According to one aspect of the invention, as shown in FIG. 2a, 2b, 2c, a media stream is setup from a sending device 100, 110 to a receiving device 200, 210. In one example, as shown in FIG. 2a, a media stream is set up between a sending mobile phone 100 and a receiving mobile phone 200, i.e. a regular video call is set up. In another example, as shown in FIG. 2b, a media stream is set up between a sending mobile phone 100 to receiving electronic device 210, such as a computer, a server or the like. An example using this set up is when a sender is making an emergency call and set up a media stream to a receiving emergency operator. All kind of sensor data is streamed and stored at the operator before the operator has confirmed the receipt of the media stream. In yet another example, as shown in FIG. 2c, a media stream is set up between a sending electronic device 110, such as a wristlet, home alarm server, refrigerator server or heating device and a receiving mobile phone 200. An example using this set up is when the home alarm is activated and set up a video stream to a mobile phone of the user, which the user can watch without having confirmed receipt of the media stream, e.g. answering the call. The user can then decide whether to confirm the receipt of the media stream e.g. answer and inactivate the alarm or not to confirm, e.g. not answer, dependent of what is shown on the media stream. Another example using this set up is when the sending device is a wristlet with a blood pressure sensor, which is streaming blood pressure data to a receiving mobile phone. Yet another example using this set up is when the sending device comprises a heat sensor, which is streaming temperature data to a receiving mobile phone.

Figure 3:
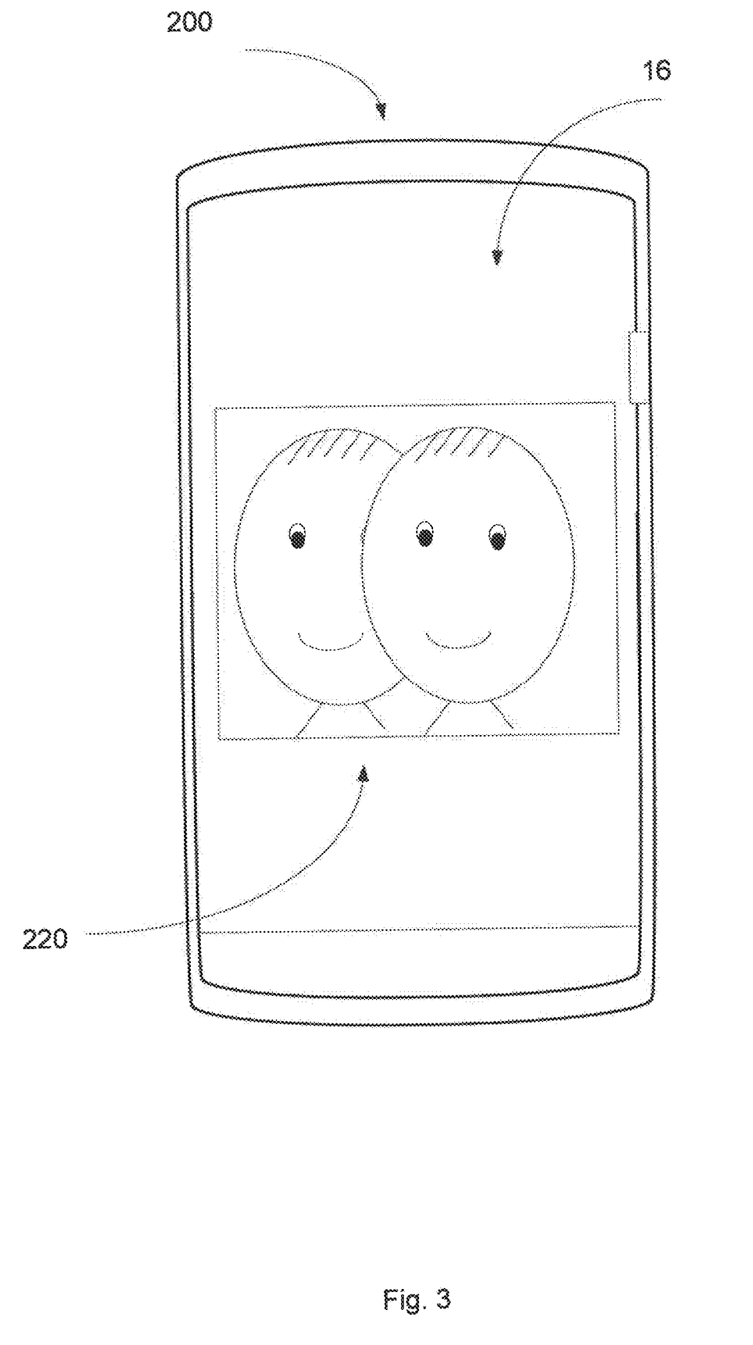
FIG. 3 discloses a block diagram of a sending electronic device e.g. a mobile phone where the method is implemented.
Figure 4:
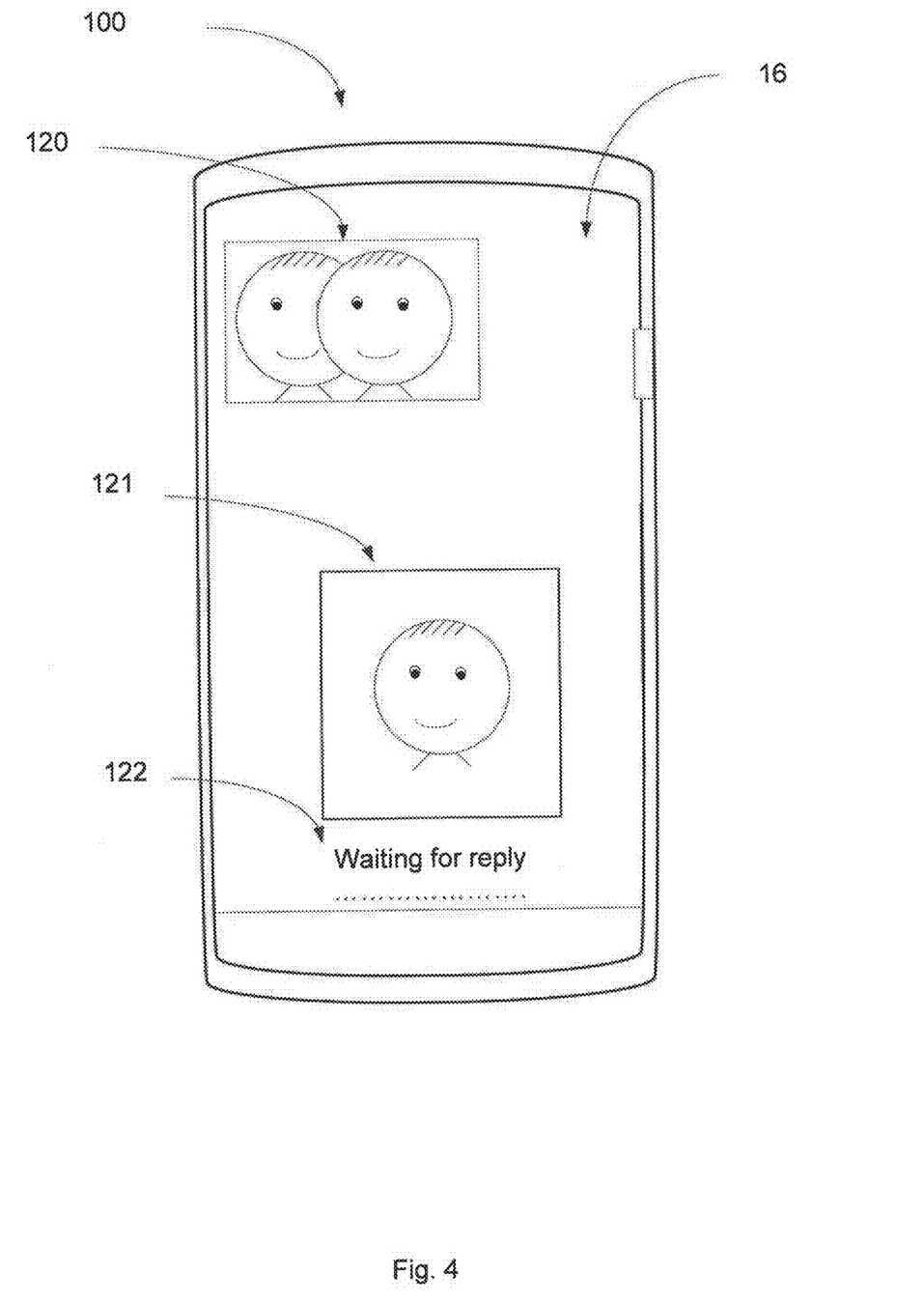
FIG. 4 discloses a block diagram of a receiving electronic device e.g. a mobile phone where the method is implemented.

According to one aspect of the invention, as shown in FIG. 3, the streaming video 220 is presented to the user 20 of the receiving device 200, 210, by using the view finder, on the display 16 of the receiving device before the receiving device confirms receipt of the streaming video. The user 10 of the sending device 100, 110 will not be able to see a streaming video, as shown in FIG. 4, showing the user 20 of the receiving device 200, 210. A still image of the user of the receiving device 121 will be shown until the receiving device has confirmed receipt of the streaming video and permitted a connection between the sending device and receiving, e.g. answering a video call. The user 10 of the sending device 100, 110 is made aware of that the camera 15 of the sending device 100, 110 is active by showing the streaming video 120 by using a view finder on the display 16 of the sending device.

Figure 5:
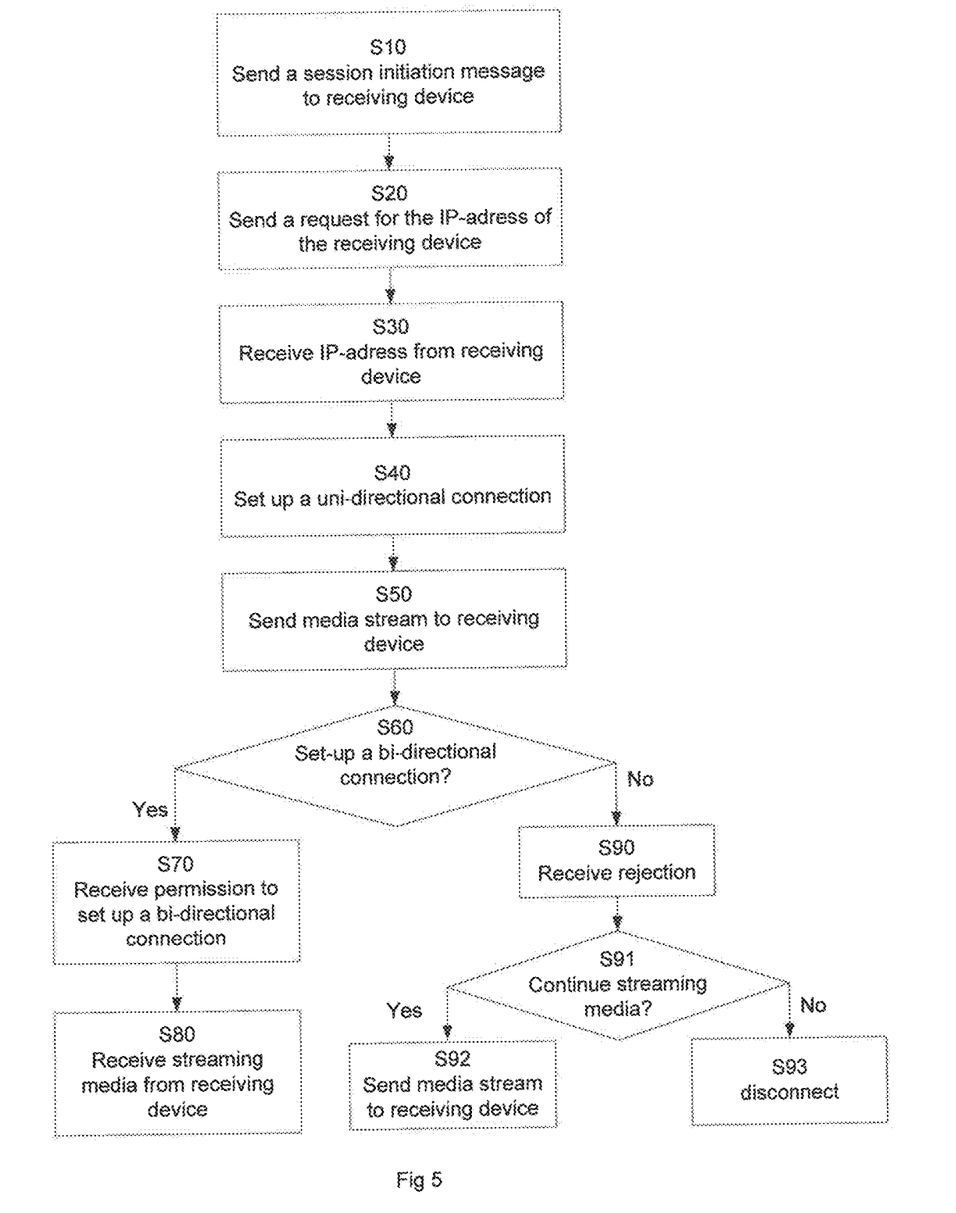
FIG. 5 discloses a flowchart of the method in a sending electronic device according to the disclosure.

The method will now be described starting from FIG. 5 disclosing method steps, performed in a sending electronic device 100, 110, of setting up a connection for streaming media between the sending electronic device 100, 110 and at least one receiving electronic device 200, 210. When the described steps are not dependent on each other, these steps may be implemented in any combination.

Figure 6A:
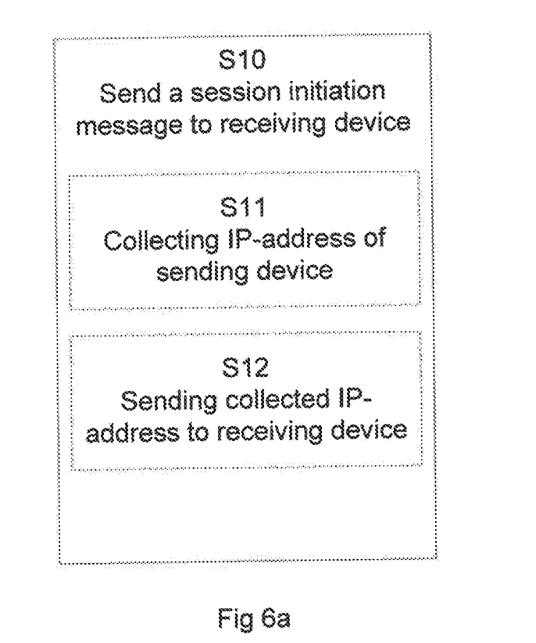
FIG. 6a-b discloses a flowchart of the method in a sending electronic device according to the disclosure.

According to one aspect the user 10 of the sending device 100, 110 wants to set a media stream to a receiving device 200, 210 and the method is initiated by the sending electronic device 100, 110 is sending a session initiation message S10 to at least one receiving device 200, 210. There are usually one session used for sending signals and one session is used for sending media, i.e. video, sound or others. A session initiation message is a message used for setting up a media session, where media session is a channel for sending media or sound. The session initiation message also comprises information about who to contact, thus which device to send the media stream, which is the receiving device 200, 210 and a list of IP addresses comprised in the sending device 100, 110. In one example the step of sending a session initiation message S10 further comprises the step to, as shown in FIG. 6a, collecting the list of IP-addresses of the sending device S11 by using a Session Traversal Utilities for Network Address Translator, STUN, protocol or another suitable protocol and sending S12 the collected IP-addresses to the at least one receiving device.

In one aspect the sending device is configured to send a request S20 for the IP-addresses of the at least one receiving device.

In one aspect, the sending device 100, 110 receives a response S30 containing the list of IP-addresses from the at least one receiving device. In one example the step of receiving S30 IP-address further comprises the step to immediately start to set up a uni-directional connection S40 between the sending 100, 110 and the at least one receiving device 200, 210 using Internet Communication Engine protocol, ICE, by trying all the IP-addresses of the list belonging to the sending device. In one aspect, the sending device initiates the session using an out-of-bound protocol, i.e. Extensible Messaging and Presence Protocol, XMPP or similar via a server, i.e. a XMPP server.

A uni-directional connection is a connection for one-way communication, such as streaming media from sending device to receiving device. A bi-directional connection is connection for a two-way communication, such as streaming media from sending device to a receiving device and from the receiving device to the sending device.

Figure 6B:
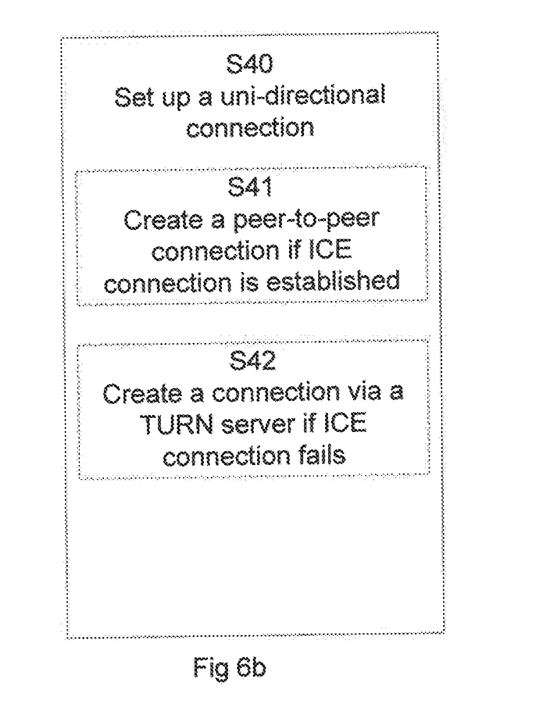

In one aspect, as shown in FIG. 6b, the step of uni-directional connection S40 by using ICE establishment further comprises the step to create S41 a peer-to-peer connection if ICE connection is established. On the other hand, if ICE connection fails a connection is created S42 via a TURN server.

In one aspect, the method further comprise a step to send the media stream S50 via the uni-directional connection to the at least one receiving device.

In one aspect, the sending device sends a request for setting-up a bi-directional connection S60 with the at least one receiving device. In one example, the sending device receives permission S70 to set up a bi-directional connection between the sending device and the receiving device. When the connection is set up the sending device receive streaming media S80 from receiving device. In another example, the sending device receives a rejection to set up a bi-directional connection S90. Then the sending device may S91 continue to stream media or not. In one example the sending device continue to stream media through the uni-directional connection S92. In one example the sending device stops to send media and disconnect S93 the uni-directional connection.

Figure 7:
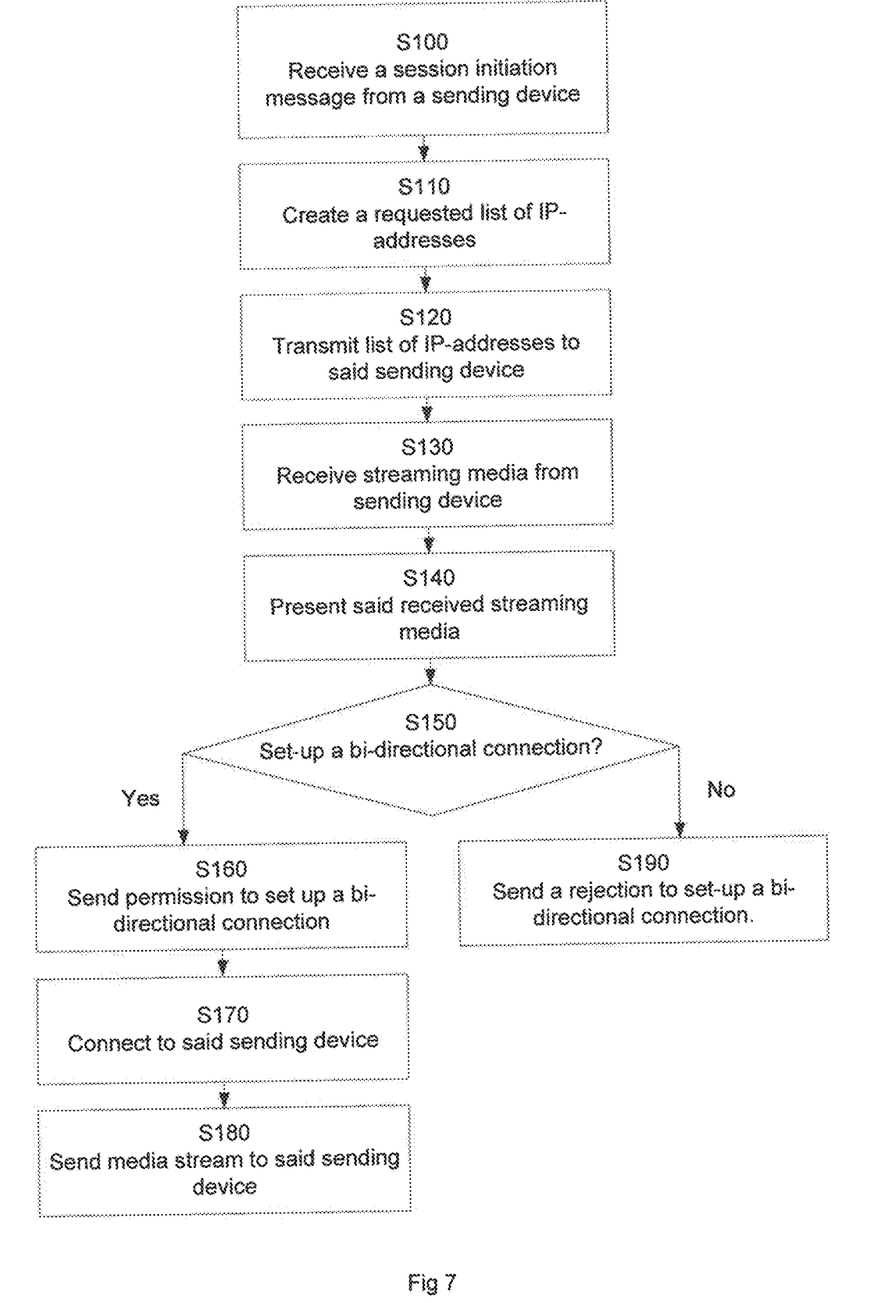
FIG. 7 discloses a flowchart of the method in a receiving electronic device according to the disclosure.

The method will now be described starting from FIG. 7 disclosing method steps, performed in a receiving electronic device 200, 210, of setting up a connection for streaming media between the sending electronic device 100, 110 and at least one receiving electronic device 200, 210. When the described steps are not dependent on each other, these steps may be implemented in any combination.

According to one aspect, the receiving device 200, 210 is woken by a GCM notification or alike, receiving a session initiation message S100 from the session server with information about the sending device 100, 110 and the list of IP addresses of the sending device collected by the same.

In one aspect, the receiving device 200, 210 creates a requested list of IP-addresses S110 by collecting its own IP-addresses and transmits the list of collected IP-addresses S120 to the sending device 100, 110 via the session server, i.e. XMPP server.

In one aspect, the receiving device receives S130 and presents S140 streaming media S130 on a user interface of the receiving device 200, 210 for acceptance from the receiving device.

In one aspect, the method further comprises the step to receive a request S150 to set up a bi-directional connection between the receiving device 200, 210 and the sending device 100, 110.

In one example, when the user of the receiving device decides to confirm a bi-directional connection S150 the receiving device sends a permission to set up a bi-directional connection S160. In one aspect, the method further comprises the step to immediately start to connect S170 to the sending device 100, 110, using the ICE protocol, by trying all the IP-addresses of the list belonging to the receiving device 200, 210. Then a bi-directional connection is set up and the receiving device sends a media stream S180 to the sending device 100, 110.

In another example, when the user of the receiving devices decides to not confirm a bi-directional connection S190 the receiving sends a rejection to set-up a bi-directional connection. Then the sending device can decide whether to continue to stream media through the uni-directional connection or to disconnect the connection and stop streaming media.

In one embodiment, as shown in FIG. 2b, a media stream is set up between a sending mobile phone 100 to receiving electronic device 210, such as a computer, a server or the like. The sending mobile phone 100, sends a session initiation message S10 and a request for setting up a uni-directional connection S20 to the receiving server 220. Further the sending mobile phone receives a response S30 containing the list of IP-addresses from the receiving server. In one example the step of receiving S30 IP-address further comprises the step to immediately start to set up a uni-directional connection S40 between the sending mobile phone 100 and the receiving server 210, using ICE protocol, by trying all the IP-addresses of the list belonging to the sending device. In one aspect, the sending device initiates the session using an out-of-bound protocol, i.e. XMPP or similar via a server, i.e XMPP server.

In one aspect, the step of setting up a uni-directional connection S40 by using ICE establishment further comprises the step to create S41 a peer-to-peer connection if ICE connection is established. On the other hand, if ICE connection fails a connection is created S42 via a TURN server.

In one aspect, the method further comprise a step to send the media stream S50 via the uni-directional connection from the sending mobile phone to the receiving server.

The receiving server 210 receives a session initiation message S100 from the sending mobile phone 100. The receiving server 210 further creates the requested list of IP-addresses by collecting its IP-addresses using Session Traversal Utilities for Network Address Translator, STUN, protocol S110 and initiates the session by transmitting the list of IP-addresses S120 using an out-of-bound protocol like XMPP or similar via a session server. The receiving server further receives a media stream S130 from the mobile phone and presents the received media stream or stores the received media stream in a memory of the receiving server.

In one embodiment, as shown in FIG. 2c, a media stream is set up between a sending server 110 to a receiving mobile phone 200. The sending server 110, sends a session initiation message S10 and a request for setting up a uni-directional connection S20 to the receiving mobile phone 200. Further the sending server receives a response S30 containing the list of IP-addresses from the receiving mobile phone. In one example the step of receiving S30 IP-address further comprises the step to immediately start to set up a uni-directional connection S40 between the sending server 110 and the mobile phone 200, using ICE protocol, by trying all the IP-addresses of the list belonging to the sending server. In one aspect, the sending server initiates the session using an out-of-bound protocol, i.e. XMPP or similar via a server, i.e. XMPP server.

In one aspect, the step of setting up a uni-directional connection S40 by using ICE establishment further comprises the step to create S41 a peer-to-peer connection if ICE connection is established. On the other hand, if ICE connection fails a connection is created S42 via a TURN server.

In one aspect, the method further comprise a step to send the media stream S50 via the uni-directional connection from the sending server to the receiving mobile phone.

The receiving mobile phone 200 receives a session initiation message S100 from the sending server 110. The receiving mobile phone 200 further creates the requested list of IP-addresses by collecting its IP-addresses using Session Traversal Utilities for Network Address Translator protocol, STUN, S110 and initiates the session by transmitting the list of IP-addresses S120 using an out-of-bound protocol like XMPP or similar via a session server. The receiving mobile phone further receives a media stream S130 from the sending server and presents the received media stream on a User Interface, such as a display of the mobile phone or stores the received media stream in a memory of the receiving mobile phone.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

The foregoing has described the principles, preferred embodiments and modes of operation of the present invention. However, the invention should be regarded as illustrative rather than restrictive, and not as being limited to the particular embodiments discussed above. The different features of the various embodiments of the invention can be combined in other combinations than those explicitly described. It should therefore be appreciated that variations may be made in those embodiments by those skilled in the art without departing from the scope of the present invention as defined by the following claims.

The invention claimed is:

1. A method for setting up a media stream connection between a sending device and a receiving device, the method performed in said sending device, and comprising the steps of:
    requesting a list of IP-addresses of said receiving device;
    receiving, by said sending device, said list of IP-addresses of said receiving device;
    establishing a first communication session that is uni-directional from said sending device to at least one IP-address from said list of IP-addresses of said receiving device;
    sending a request to establish a second communication session to support bidirectional media streams between said sending device and said receiving device; and
    sending said media stream to said receiving device from said sending device, via said at least one IP-address, and over said first uni-directional communication session, before receiving a response from said receiving device to said request to establish a second communication session to support bidirectional media streams between the sending device and the receiving device.

2. The method according to claim 1, wherein said method further comprises the steps of:
    sending a session initiation message to said receiving device, including information about which device to send said media stream, which is said receiving device, and a list of IP addresses of said sending device.

3. The method according to claim 1, wherein said method further comprises the step of:
    receiving permission from said receiving device to establish said second communication session to support bidirectional media streams between said sending device and the receiving device.

4. The method according to claim 3, wherein said method further comprises the step of:
    receiving a second media stream from said receiving device via said second communication session.

5. The method according to claim 3, wherein said method further comprises the steps of:
    receiving a rejection to said request to establish said second communication session to support bidirectional media streams between said sending device and said receiving device; and
    sending said media stream to said receiving device until receiving a disconnect of said first communication session that is uni-directional from said sending device to at least one IP-address from said list of IP-addresses of said receiving device.

6. The method according to claim 2, wherein said list of IP-addresses is collected by using Session Traversal Utilities for Network Address Translator protocol (STUN).

7. The method according to claim 1, wherein the step of establishing said first communication session that is uni-directional from said sending device to at least one IP-address from said list of IP-addresses of said receiving device further comprises the step of:
    connecting to said receiving device using Internet Communication Engine protocol (ICE), by trying each IP-address contained in the list of IP-addresses of said receiving device.

8. The method according to claim 7, wherein the step of connecting further comprises:
    creating a peer-to-peer connection if the ICE connection is established; and
    creating a connection via a Traversal Using Relays Network Translator server, server if the ICE connection fails.

9. A method for setting up a media stream connection between a sending device and a receiving device, the method performed in said receiving device, and comprising the steps of:
    receiving, by said receiving device, a request for a list of IP-addresses of said receiving device;
    creating, by said receiving device, said requested list of IP-addresses of said receiving device and transmitting said list to said sending device;
    establishing a first communication session that is uni-directional from said sending device to at least one IP-address from said list of IP-addresses of said receiving device;
    receiving a request to establish a second communication session to support bidirectional media streams between the sending device and the receiving device;
    receiving said media stream at said receiving device from said sending device, via said at least one IP-address, and over said first uni-directional communication session, before sending a response from said receiving device to said request to establish a second communication session to support bidirectional media streams between the sending device and the receiving device.

10. The method according to claim 9, wherein said method further comprises the step of:
    sending permission to establish said second communication session to support bidirectional media streams between the sending device and the receiving device.

11. The method according to claim 10, wherein said method further comprises the step of:
    sending a media stream to said sending device via said second communication session to support bidirectional media streams between the sending device and the receiving device.

12. The method according to claim 9, wherein said method further comprises the step of:
    sending a rejection to said request to establish said second communication session to support bidirectional media streams between the sending device and the receiving device.

13. The method according to claim 9, wherein said method further comprises the steps of:
    presenting said media stream on a user interface of said receiving device; and
    sending a response from said receiving device to said request to establish a second communication session to support bidirectional media streams between the sending device and the receiving device
    wherein the step of presenting said media stream is presented before the step of sending a response.

14. The method according to claim 13, wherein said method further comprises the step of:
    sending permission to establish said second communication session to support bidirectional media streams between the sending device and the receiving device.

15. The method according to claim 14, wherein the sending permission is configured to be a user-initiated event.

* * * * *